(12) United States Patent
Oldham et al.

(10) Patent No.: US 6,772,849 B2
(45) Date of Patent: Aug. 10, 2004

(54) PROTECTIVE OVERLAY COATING FOR PDC DRILL BITS

(75) Inventors: Thomas W. Oldham, The Woodlands, TX (US); Kumarj T. Kembaiyan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 61 days.

(21) Appl. No.: 10/032,999

(22) Filed: Oct. 25, 2001

(65) Prior Publication Data

US 2003/0079916 A1 May 1, 2003

(51) Int. Cl.[7] .......................... E21B 10/08; E21B 10/16
(52) U.S. Cl. .................. 175/433; 175/374; 175/435
(58) Field of Search ................ 175/425, 428, 175/426, 433, 435, 374, 375

(56) References Cited

U.S. PATENT DOCUMENTS

| | | | |
|---|---|---|---|
| 3,294,186 A | * 12/1966 | Buell ...................... 175/420.1 |
| 4,156,329 A | * 5/1979 | Daniels et al. ................ 51/295 |
| 4,350,215 A | * 9/1982 | Radtke ........................ 175/433 |
| 4,359,335 A | * 11/1982 | Garner ........................... 419/6 |
| 4,396,077 A | 8/1983 | Radtke ........................ 175/329 |
| 4,453,605 A | 6/1984 | Short, Jr. .................... 175/410 |
| 4,455,278 A | * 6/1984 | van Nederveen et al. ....... 419/6 |
| 4,460,053 A | 7/1984 | Jurgens et al. .............. 175/329 |
| 4,499,958 A | 2/1985 | Radtke et al. ............... 175/329 |
| 4,592,252 A | * 6/1986 | Ecer ........................... 76/108.2 |
| 4,593,776 A | * 6/1986 | Salesky et al. ............. 175/375 |
| 4,597,456 A | * 7/1986 | Ecer ............................ 175/371 |
| 4,630,692 A | 12/1986 | Ecer ........................... 175/330 |
| 4,781,770 A | 11/1988 | Kar .......................... 148/16.5 |
| 4,814,234 A | * 3/1989 | Bird ............................ 428/564 |
| 4,907,665 A | * 3/1990 | Kar et al. .................... 175/426 |
| 5,186,268 A | 2/1993 | Clegg ......................... 175/399 |
| 5,279,374 A | 1/1994 | Sievers et al. .............. 175/374 |
| 5,348,770 A | * 9/1994 | Sievers et al. .............. 427/422 |
| 5,535,838 A | 7/1996 | Keshavan et al. .......... 175/374 |
| 5,733,664 A | 3/1998 | Kelley et al. ............... 428/457 |
| 6,068,072 A | 5/2000 | Besson et al. .............. 175/432 |
| 6,098,729 A | * 8/2000 | Matthias ................... 175/420.1 |
| 6,124,564 A | 9/2000 | Sue et al. ............... 219/121.47 |
| 6,138,779 A | * 10/2000 | Boyce ........................ 175/374 |
| 6,170,583 B1 | * 1/2001 | Boyce ........................ 175/426 |
| 6,196,338 B1 | 3/2001 | Slaughter et al. ........... 175/331 |
| 6,439,327 B1 | * 8/2002 | Griffin et al. ............... 175/434 |
| 6,564,884 B2 | 5/2003 | Bird ............................. 175/57 |

OTHER PUBLICATIONS

European Search Report dated Apr. 15, 2003 (1 pg.).

* cited by examiner

*Primary Examiner*—David Bagnell
*Assistant Examiner*—Jennifer H Gay
(74) *Attorney, Agent, or Firm*—Osha & May L.L.P.

(57) ABSTRACT

In one embodiment, a method of increasing a durability of a drill bit having a bit body with at least one blade disposed thereon, at least one cutter pocket disposed on the blade, and at least one cutter disposed in the cutter pocket is disclosed. The method includes brazing the at least one cutter to the at least one cutter pocket so that a braze material disposed between the at least one cutter pocket and the at least one cutter comprises an exposed surface, and overlaying at least a portion of the exposed surface with a hardfacing material, wherein the hardfacing material includes a binder having a melting point selected to avoid damaging the cutter. In one embodiment, a rock bit including a matrix bit body having at least one blade thereon, at least one cutter pocket disposed on the blade, at least one cutter disposed in the cutter pocket, a braze material disposed between the cutter and the pocket, the braze material having an exposed surface, and an overlay coating applied proximate to the at least one cutter, wherein the overlay coating is adapted to cover an exposed surface of braze material proximate to the at least one cutter is disclosed.

18 Claims, 3 Drawing Sheets

PROTECTIVE OVERLAY COATING FOR PDC DRILL BITS

BACKGROUND OF INVENTION

1. Field of the Invention

The invention relates generally to drill bits that have polycrystalline diamond compact ("PDC") cutters thereon.

2. Background Art

Polycrystalline diamond compact ("PDC") cutters have been used in industrial applications including rock drilling and metal machining for many years. In these applications, a compact of polycrystalline diamond (or other superhard material such as cubic boron nitride) is bonded to a substrate material, which is typically a sintered metal-carbide, to form a cutting structure. A compact is a polycrystalline mass of diamonds (typically synthetic) that is bonded together to form an integral, tough, high-strength mass.

A PDC cutter may be formed by placing a cemented carbide substrate into the container of a press. A mixture of diamond grains or diamond grains and catalyst binder is placed atop the substrate and compressed under high pressure, high temperature conditions. In so doing, metal binder migrates from the substrate and passes through the diamond grains to promote a sintering of the diamond grains. As a result, the diamond grains become bonded to each other to form the diamond layer, and the diamond layer is subsequently bonded to the substrate. The substrate is often a metal-carbide composite material, such as sintered tungsten carbide (tungsten carbide/cobalt).

An example of a rock bit for earth formation drilling using PDC cutters is disclosed in U.S. Pat. No. 5,186,268. FIGS. 1 and 2 from that patent show a rotary drill bit having a bit body 10. The lower face of the bit body 10 is formed with a plurality of blades 16–25, which extend generally outwardly away from a central longitudinal axis of rotation 15 of the drill bit. A plurality of PDC cutters 26 is disposed side by side along the length of each blade. The number of PDC cutters 26 carried by each blade may vary. Each PDC cutter 26 is received and secured within a cutter pocket 27 in the respective blade and bonded to the pocket by brazing.

U.S. Pat. No. 4,453,605, issued to Short, Jr., describes a typical method of brazing. In a typical brazing technique, a braze foil (which may be a silver brazing alloy, for example) is wrapped around a cutter. The braze foil is wrapped on the cutter in a manner such that the excess foil is allowed to protrude above a top side of the cutter. Thus, when placed in a cutter pocket, the excess foil protrudes through a gap in the cutter pockets (i.e., the gap is a clearance between the cutter and the cutter pocket). The bit head is then heated to a predefined brazing temperature of on the order of 1300° F., but less than a thermal degradation temperature of the cutter. The system is allowed to cool, causing the braze material to harden, which fixes the cutter in the cutter pocket. Cooling may be performed by passing an inert gas over the drill bit.

In one class of PDC bits, PDC cutters are brazed into the pockets of a matrix body. In these bits, the matrix material is typically infiltrated with binder materials to form the body. In another class of PDC bits, PDC cutters are brazed into the pockets of a machined steel body, commonly referred to as "steel body PDC bits." While steel body bits have toughness and ductility properties which make them resistant to failure due to impact forces generated during drilling, steel is more susceptible to erosive wear caused by high-velocity drilling fluids and formation fluids which carry abrasive particles, such as sand and rock cuttings. Therefore, these steel bits are normally "hardfaced" with a hard, wear resistant coating to provide additional abrasive and erosive resistance.

U.S. Pat. No. 6,196,338, issued to Slaughter, describes one typical method of depositing a hardfacing layer on a roller cone drill bit. Hardfacing material generally includes a metallic component and a nonmetallic component. The metallic component can be any metal or metal alloy, such as iron, steel, nickel-based alloys, etc. The nonmetallic component generally includes a hard material, such as carbide, boride, and/or nitride. The volume content of the carbide phase is generally in the range of about 25%–60%, depending on the particular requirements. Examples of the carbides used in the carbide phase include single crystal tungsten carbide, eutectic $WC/W_2C$, sintered WC/Co, or a combination of the above. The balance of the hardfacing material is a binder matrix, which is generally in the range of about 35%–75% of the volume of the hardfacing material. Often, the hardfacing material is formed in the shape of a "tube," which is then heated by a torch to deposit the hardfacing material onto the cutter surface. Such a method is often termed "tube hardfacing."

Typically, the hardfacing is applied to the entire bit. A hardfacing layer may be deposited onto the steel surface by the torch method mentioned above, by thermal spray, or alternatively, the hardfacing material may be deposited by an "arc process." In particular, a plasma transferred arc (PTA) welding process may be used. The PTA welding process uses a torch similar to a conventional plasma arc torch with an electrode grounded to the work piece. The PTA system generally includes two power supplies: a pilot arc power supply and a transferred arc power supply. In the PTA welding process, a pilot plasma arc is initiated between a tungsten electrode and a copper orifice with a water cooled electrode. An inert gas, such as argon, flowing through the orifice is ionized so that it initiates a secondary arc between the tungsten electrode and the bit, when the current is increased. Hardfacing powder of a suitable composition is injected into the plasma column by a carrier gas. A molten pool forms on the bit in the arc transfer region. Fusion occurs between the deposited powder and the bit.

Typically, after a hardfacing layer has been applied to the bit body in a PDC bit, the PDC cutters are then brazed into the cutter pockets. However, as described above, a non-hardfaced region may exist between the PDC cutter and the cutter pocket, called a "gap," herein. The gap is generally filled with the melted metal brazing alloy, which may be a silver brazing alloy. When the PDC bit is used to drill formations in a downhole environment, wellbore fluids may erode the braze material around the cutter. The braze alloy is relatively soft as compared to the other materials and offers little erosion resistance. If the erosion becomes significant, the steel surrounding the braze deposit also becomes eroded, and a deep cavity forms around the PDC cutters. The strength of the braze may be reduced such that the PDC cutter may be forced out of the cutter pocket, thereby altering a cutting structure and, e.g., a force distribution over the bit. If a significant number of PDC cutters are forced from their respective pockets, drilling operations may have to be stopped so that a new bit can be attached.

What is needed, therefore, is a way to reduce erosion associated with braze alloy around PDC cutter elements.

SUMMARY OF INVENTION

In one aspect, the present invention relates to a method of increasing the durability of a drill bit having a bit body having a hardfacing layer thereon, with at least one blade disposed thereon, at least one cutter pocket disposed on the blade, and at least one cutter disposed in the cutter pocket. The method includes brazing at least one cutter into a cutter pocket so that a brazing material disposed between at least one cutter pocket and at least one cutter forms an exposed surface, and overlaying the exposed surface with a hardfacing material.

In another aspect, the present invention relates to a drill bit including a bit body having at least one blade thereon, at least one cutter pocket disposed on the blade, at least one cutter disposed in the cutter pocket, a braze material disposed between the at least one cutter and the at least one cutter pocket, the braze material having an exposed surface, and an overlay coating applied proximate to the at least one cutter, wherein the overlay coating is adapted to cover the exposed surface of braze material proximate to the at least one cutter.

In another aspect, the present invention relates to a method of increasing a durability of a drill bit having a bit body with at least one blade disposed thereon, at least one cutter pocket disposed on the blade, and at least one cutter disposed in the cutter pocket, where the method includes brazing the at least one cutter to the at least one cutter pocket so that a braze material disposed between the at least one cutter pocket and the at least one cutter defines an exposed surface, and overlaying the exposed surface with a hardfacing material, the hardfacing material including a binder with sufficiently low melting point so as not to damage the at least one cutter.

Other aspects and advantages of the invention will be apparent from the following description and the appended claims.

DETAILED DESCRIPTION

The present invention relates to a method for reducing fluid erosion in brazed, hardfaced PDC drill bits, and a novel bit structure therefor.

Figure 1:
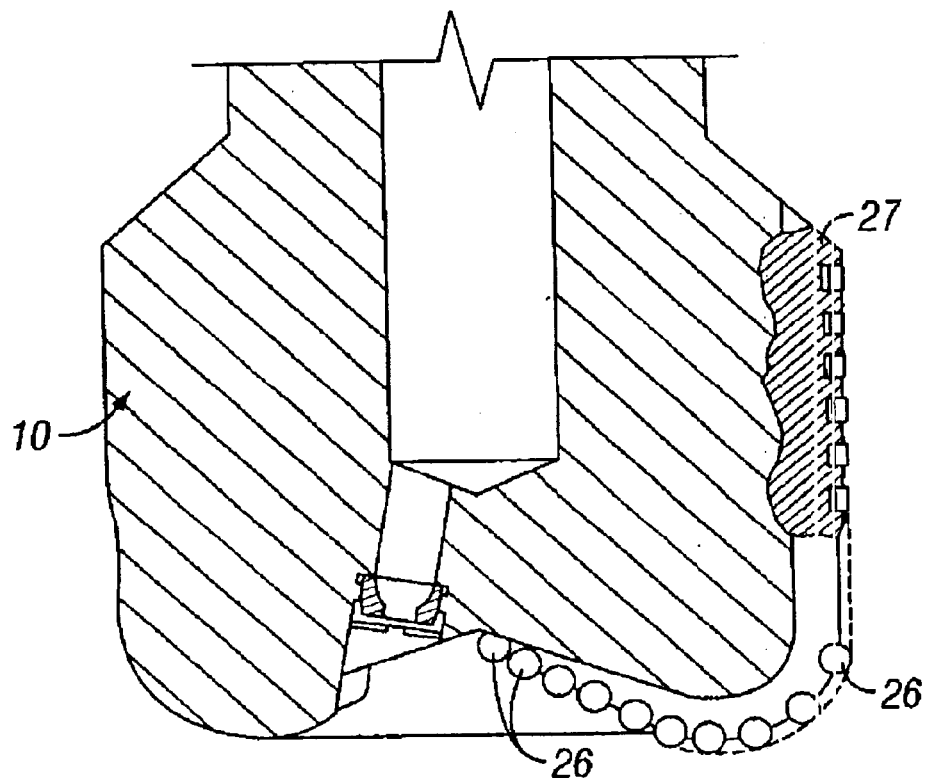
FIG. 1 shows a prior art drill bit having PDC cutters.
Figure 2:
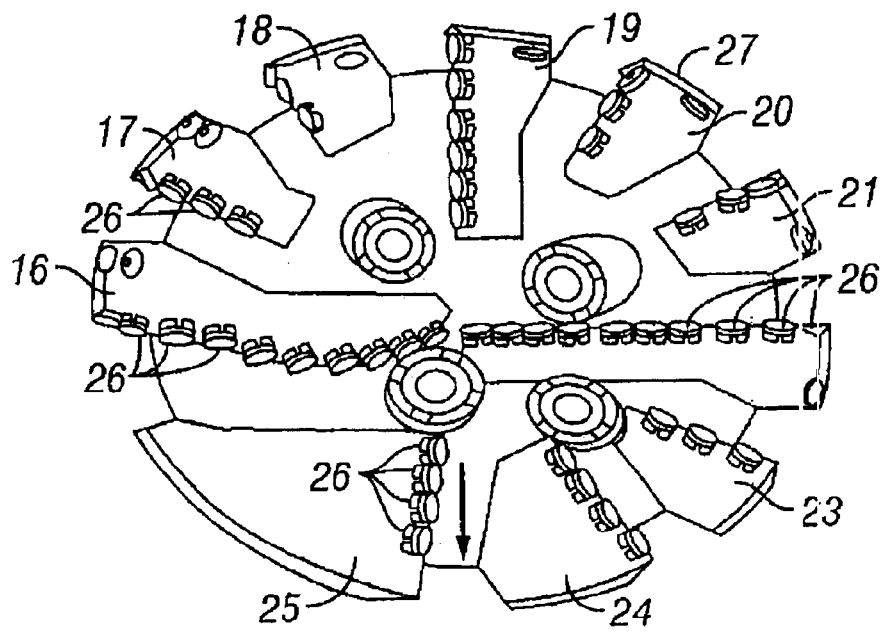
FIG. 2 shows a prior art drill bit having PDC cutters.
Figure 3:
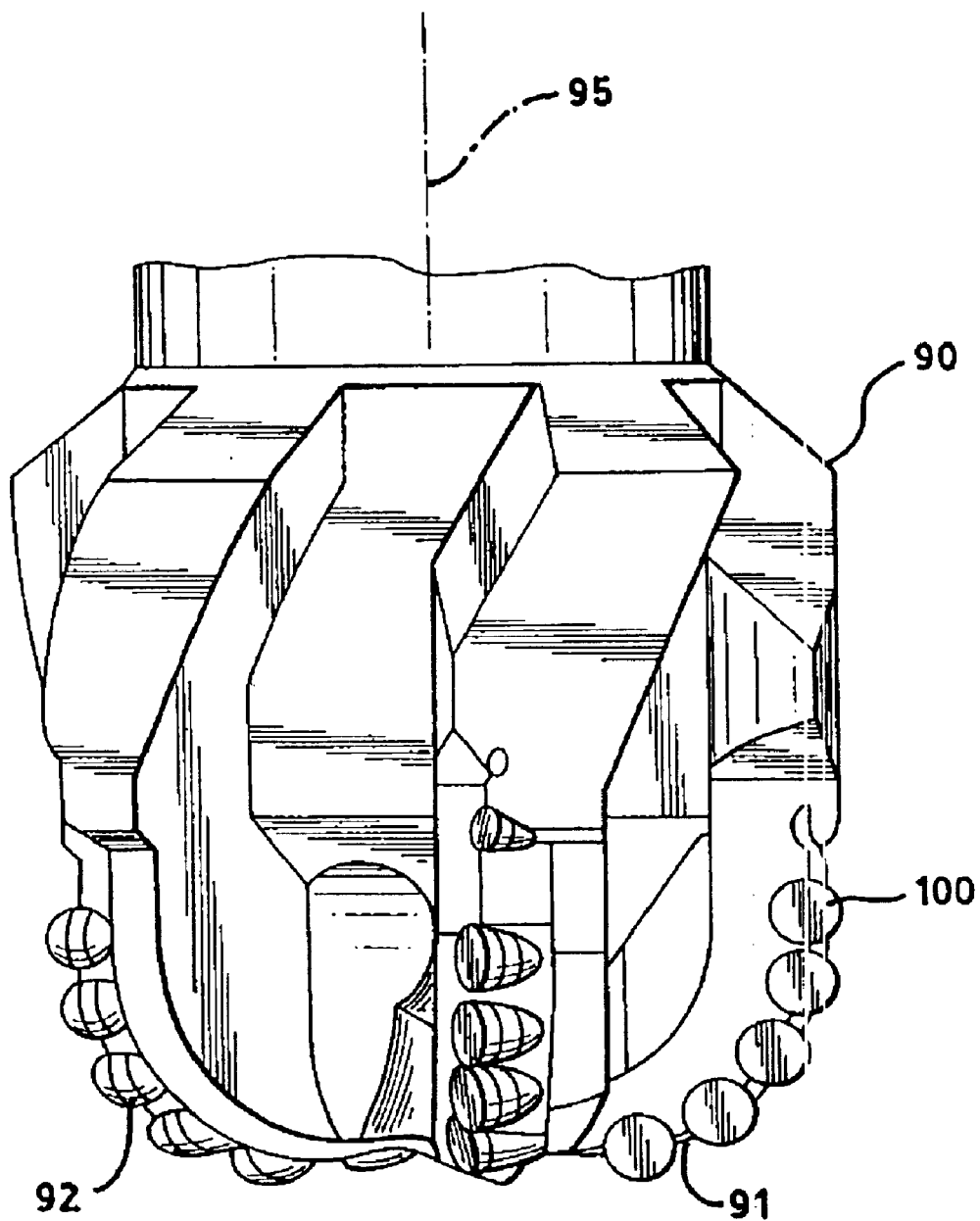
FIG. 3 shows a drill bit comprising PDC cutters in accordance with an embodiment of the present invention.

FIG. 3 shows a steel drill bit body 90 comprising at least one PDC cutter 100. The steel drill bit body 90 is formed with at least one blade 91, which extends generally outwardly away from a central longitudinal axis 95 of the drill bit 90. In the present embodiment, the steel drill bit body 90 includes a hardfacing layer (not separately shown) applied using any technique known in the art, such as "tube," thermal spray, or arc hardfacing. The PDC cutter 100 is disposed on the blade 91. The number of blades 91 and/or cutters 100 is related, among other factors, to the type of formation to be drilled, and can thus be varied to meet particular drilling requirements. The PDC cutter 100 may be formed from a sintered tungsten carbide composite substrate (not shown separately in FIG. 3) and a polycrystalline diamond compact (not shown separately in FIG. 3), among other materials. The polycrystalline diamond compact and the sintered tungsten carbide substrate may be bonded together using any method known in the art.

Figure 4:
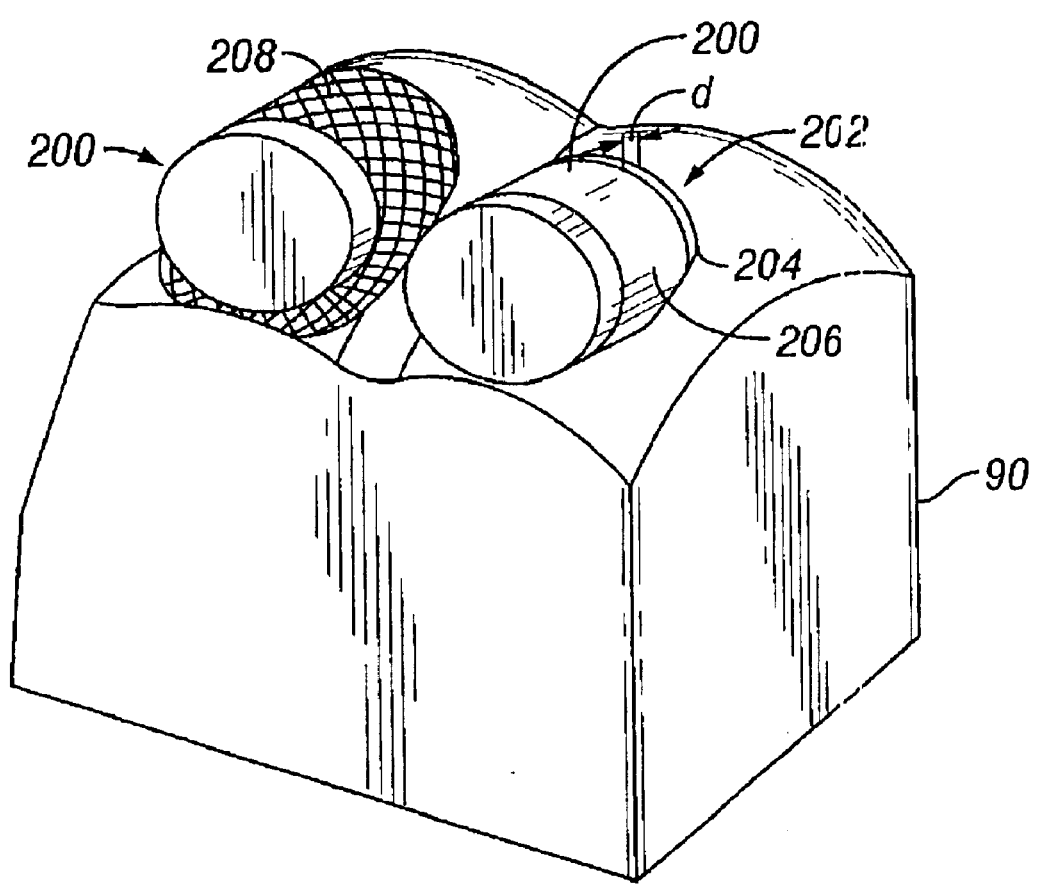
FIG. 4 shows an expanded top view of a single PDC cutter in accordance with an embodiment of the present invention.

In the present embodiment, the blade 91 comprises at least one cutter pocket 92 which is adapted to receive the PDC cutter 100, and the PDC cutter 100 is usually brazed into the cutter pocket 92. FIG. 4 shows two PDC cutters 200 after brazing. Brazing may be accomplished by any means known in the art, and no limitation on the scope of the invention is intended by any specific reference to a particular brazing material and/or method. In FIG. 4, the PDC cutter 200 is surrounded by braze material 202. The braze material 202 is disposed in the cutter pocket 204. The area between a surface 206 of the cutting element 202 and a leading edge of the cutter pocket 204 (i.e., a circumferential width of braze material 202) is termed "d." After brazing the cutting elements 200, the drill bit is subjected to an overlay coating 208. The overlay coating 208 is applied in an amount sufficient to at least cover a substantial portion of the area d. A typical bit will include a plurality of PDC cutters each in a corresponding pocket brazed or otherwise affixed to the bit body.

In one embodiment, the overlay coating may be applied by a high velocity oxygen fuel (HVOF) spray process as described in U.S. Pat. No. 5,535,838, issued to Keshavan et al., which is assigned to the assignee of the present invention. Briefly, a spray axis of an apparatus for the thermal spray process is preferably aligned perpendicular to a surface of a PDC bit. The nozzle of the apparatus then emits detonation waves of hot gases at very high velocities, the detonation waves entraining, for example, powdered tungsten carbide therein. A fluid substance such as liquid carbon dioxide may be used to cool the PDC bit during the thermal spray process, thereby preventing the PDC bit from being heated above 400° F. In this embodiment, a layer of hardfacing has been applied to the PDC bit prior to brazing the PDC cutters into the cutter pockets. Therefore, the overlay layer applied by the HVOF process acts is a "second" hardfacing layer.

Because the HVOF spray process imparts relatively low amounts of heat into the bit, the cutters (not numbered separately) disposed on the PDC bit are not damaged. The PDC bit temperature can be controlled by adjusting the coolant flow and deposition rate. The thermal spray process is repeated many times per second, and after a selected thickness is reached, or after a selected time has elapsed, the apparatus or the PDC bit may be moved and the above process repeated. As a result, substantially all of area d (i.e., substantially all of the exposed braze material) may be overlayed with a hardfacing material.

A typical tungsten carbide-cobalt layer (i.e., the entrained powder) may comprise a cobalt content of about 7 to 20 weight percent, a carbon content of about 0.5 to about 6 weight percent, and a tungsten content from about 74 to 92.5 weight percent. However, depending on the particular application, the relative weight percents of the various chemical components may be varied.

In a second embodiment, the overlay coating is deposited over area d using a hardfacing material having a binder with sufficiently low melting point so as to not damage the PDC cutters during application. In this embodiment, the hardfacing binder is a brazing wire that is applied over area d by a torch separately from the application of the tungsten carbide particles. After applying a base coat of brazing alloy 202, tungsten carbide particles are flame sprayed onto the braze deposit. Additional braze wire may be added to ensure bonding of the carbide particles. As a result, the deposited tungsten carbide and braze material together form a hardface overlay coating. Importantly, the entire area d does not have to be covered by the overlay coating to improve the durability of the bit. Any amount of overlaying coating that improves the durability of the bit by a measurable amount is expressly within the scope of the present invention.

While the above embodiment makes reference to tungsten carbide particles, no limitation is intended on the scope of the invention by such a description. It is specifically within the scope of the present invention that other "hard materials" such as transition metal oxides, transition metal nitrides, transition metal borides, other transition metal carbides, and alloys thereof may be used. In addition, no limitation is intended by the description of the method of depositing the hard metal. Specifically, it is within the scope of the present invention that any method known to one skilled in the art may be used to apply the hard material. For example, the brazing alloy and the hard particles may be combined into solid or tube rod, or they may be mixed as powders and applied by powder deposition methods. In addition, while reference has been made to a steel bit body, it is specifically within the scope of the present invention that a matrix bit body may also be used in accordance with the present invention. Note that as used herein, a "matrix" bit body refers to a bit body formed at least in part from a matrix material infiltrated with a binder alloy. Examples of these infiltrated materials may be found in, for example, U.S. Pat. No. 4,630,692 issued to Ecer and U.S. Pat. No. 5,733,664 issued to Kelley et al. These materials are advantageous because they are highly resistant to erosive and abrasive wear, yet are tough enough to withstand shock and stresses associated harsh drilling conditions.

It should be noted that references to the use of specific substrate compositions are for illustrative purposes only, and no limitation on the type of substrate used is intended. As an example, it is well known that various metal carbide compositions, in addition to tungsten carbide, may be used. Specifically, other types of hardfacing materials may be used to deposit the overlay coating, including oxides, nitrides, borides, and other materials known in the art. In particular, it is expressly within the scope of the present invention that any transition metal oxide, transition metal nitride, transition metal boride, transition metal carbide, or alloys thereof may be used. In addition, while reference is made below to a single blade/PDC cutter system, no limitation on the scope of the invention is intended thereby. In addition, the overlay coating need not be applied to all of the exposed braze region "d," but rather only a portion may be covered depending on the particular requirements of a user.

In general, any method of depositing hardfacing may be used with any suitable hardfacing composition so long as the cutter remains undamaged and the braze alloy is not melted sufficiently to cause the cutter to be released from the pocket. Further, temperature should be closely controlled because, depending on the type of hardfacing, the method of deposition, and type of PDC cutter, among other factors, some temperatures may cause types of damage to the PDC cutter other than those described above. Additionally, any method of depositing the hard metal may be used with any suitable hard metal so long as the cutter remains undamaged. In this embodiment, however, melting the braze alloy is not as significant a concern because melting the braze alloy may actually improve the bond between the hard metal and the drill bit body.

Advantageously, the present invention provides a method for reducing fluid erosion in PDC bits. By preventing erosion of the cutter pockets, the present invention improves the durability of PDC bits. Further, the present invention advantageously provides a durable, extended wear-life PDC bit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of increasing a durability of a drill bit having a bit body, with at least one blade disposed thereon, at least one cutter pocket disposed on the blade, and at least one polycrystalline diamond compact cutter disposed in the cutter pocket, the method comprising:

brazing the at least one polycrystalline diamond compact cutter to the at least one cutter pocket so that a braze material disposed between the at least one cutter pocket and the at least one polycrystalline diamond compact cutter comprises an exposed surface; and overlaying at least a portion of the exposed surface with a hardfacing material, the hardfacing material comprising a binder having a melting point selected to avoid damaging the polycrystalline diamond compact cutter.

2. The method of claim 1, further comprising:

re-applying braze material over the hardfacing material.

3. The method of claim 2, wherein the binder comprises the braze material.

4. The method of claim 1, wherein the hardfacing material comprises tungsten carbide.

5. The method of claim 1, wherein overlaying comprises depositing the hardfacing material by welding.

6. The method of claim 1, wherein the hardfacing material comprises at least one compound selected from the group consisting of transition metal borides, transition metal carbides, transition metal nitrides, transition metal oxides, and alloys thereof.

7. The method of claim 1, wherein a first hardfacing material is applied to a surface of the bit prior to the brazing.

8. The method of claim 7, wherein the bit body is formed from steel.

9. The method of claim 1, wherein the bit body is formed from matrix material.

10. The method of claim 1, wherein after overlaying, at least a portion of a cutting face of the at least one polycrystalline diamond compact cutter is exposed.

11. A drill bit comprising:

a matrix bit body having at least one blade thereon;

at least one cutter pocket disposed on the blade;

at least one polycrystalline diamond compact cutter disposed in the at least one cutter pocket;

a braze material disposed between the at least one polycrystalline diamond compact cutter and the at least one cutter pocket, the braze material having an exposed surface; and a first overlay coating applied over at least part of the exposed surface, wherein the first overlay coating comprises a hardfacing material comprising a binder having a melting point selected to avoid damaging the polycrystalline diamond compact cutter when applied.

12. The bit of claim 11, wherein the first overlay coating comprises at least one compound selected from the group consisting of transition metal borides, transition metal carbides, transition metal nitrides, transition metal oxides, and alloys thereof.

13. The bit of claim 11, further comprising:

a second overlay coating deposited on the first overlay coating.

14. The bit of claim 13, wherein the second overlay coating comprises the braze material.

15. A drill bit comprising:

a steel bit body having hardfacing thereon and having at least one blade thereon;

at least one cutter pocket disposed on the blade;

at least one polycrystalline diamond compact cutter disposed in the at least one cutter pocket;

a braze material disposed between the at least one polycrystalline diamond compact cutter and the at least one cutter pocket, the braze material having an exposed surface; and a first overlay coating applied over at least part of the exposed surface, wherein the first overlay coating comprises a hardfacing material comprising a binder having a melting point selected to avoid damaging the polycrystalline diamond compact cutter when applied.

16. The bit of claim 15, wherein the first overlay coating comprises at least one compound selected from the group consisting of transition metal borides, transition metal carbides, transition metal nitrides, transition metal oxides, and alloys thereof.

17. The bit of claim 15, further comprising:

a second overlay coating deposited on the first overlay coating.

18. The bit of claim 17, wherein the second overlay coating comprises the braze material.

* * * * *

UNITED STATES PATENT AND TRADEMARK OFFICE
CERTIFICATE OF CORRECTION

PATENT NO. : 6,772,849 B2
DATED : August 10, 2004
INVENTOR(S) : Thomas W. Oldham et al.

It is certified that error appears in the above-identified patent and that said Letters Patent is hereby corrected as shown below:

<u>Title page,</u>
Item [75], Inventors, please correct the second inventor's first name from "Kumarj" to -- Kumar --.

<u>Column 6,</u>
Line 7, please remove the comma after the word "body" and before the "with".

Signed and Sealed this

Twenty-first Day of December, 2004

JON W. DUDAS
*Director of the United States Patent and Trademark Office*